United States Patent
Bode et al.

(10) Patent No.: US 7,991,076 B2
(45) Date of Patent: Aug. 2, 2011

(54) COMPLEX SIGNAL SCALING FOR PHASE AND/OR AMPLITUDE MODULATED SIGNALS

(75) Inventors: Peter Bode, Nuremberg (DE); Alexander Lampe, Leipzig (DE); Markus Helfenstein, Lucerne (CH)

(73) Assignee: ST-Ericsson SA, Plan-les Ouates (CH)

( * ) Notice: Subject to any disclaimer, the term of this patent is extended or adjusted under 35 U.S.C. 154(b) by 550 days.

(21) Appl. No.: 11/572,910

(22) PCT Filed: Jul. 13, 2005

(86) PCT No.: PCT/IB2005/052325
§ 371 (c)(1), (2), (4) Date: Feb. 17, 2009

(87) PCT Pub. No.: WO2006/013487
PCT Pub. Date: Feb. 9, 2006

(65) Prior Publication Data
US 2009/0175380 A1 Jul. 9, 2009

(30) Foreign Application Priority Data
Jul. 29, 2004 (EP) .................................. 04300497

(51) Int. Cl.
*H04L 27/04* (2006.01)

(52) U.S. Cl. ........ 375/300; 375/295; 375/296; 375/297; 455/91; 455/108; 455/114.3; 455/127.2; 330/149

(58) Field of Classification Search ................. 375/295, 375/296, 300; 455/91, 108, 114.3, 127.2; 330/149
See application file for complete search history.

(56) References Cited

U.S. PATENT DOCUMENTS

| 5,111,155 | A | * | 5/1992 | Keate et al. ................... 330/149 |
| 6,275,685 | B1 | * | 8/2001 | Wessel et al. ................. 455/126 |
| 6,411,979 | B1 | | 6/2002 | Greenberger |
| 6,956,433 | B2 | * | 10/2005 | Kim et al. ..................... 330/149 |
| 7,062,233 | B2 | * | 6/2006 | Huttunen ..................... 455/114.3 |

FOREIGN PATENT DOCUMENTS

| EP | 0 764 915 A3 | 1/1999 |
| WO | 02/17586 A1 | 2/2002 |
| WO | WO0217586 A | 2/2002 |

OTHER PUBLICATIONS

Behzad Razavi, *Design of Analog CMOS Integrated Circuits*, (McGraw-Hill, 2001).

* cited by examiner

*Primary Examiner* — David C Payne
*Assistant Examiner* — Leon Flores
(74) *Attorney, Agent, or Firm* — Jeremiah J. Baunach; Seed IP Law Group PLLC

(57) ABSTRACT

A signal scaling device (D), for a transmission path of a wireless communication equipment, comprises a processing means (PM) adapted to receive a phase and/or amplitude modulated signal (I/Q) to transmit, and arranged to multiply said phase and/or amplitude modulated signal with a chosen complex gain in order to output said phase and/or amplitude modulated signal with a chosen scaled amplitude and a chosen phase offset.

19 Claims, 6 Drawing Sheets

COMPLEX SIGNAL SCALING FOR PHASE AND/OR AMPLITUDE MODULATED SIGNALS

BACKGROUND

1. Technical Field

The present invention relates to the transmission path (or section) of the wireless communication equipments using phase and/or amplitude modulated signals, and more precisely to the signal scaling in such equipments.

2. Description of the Related Art

As it is known by one skilled in the art the transmission path of certain wireless communication equipments, such as GSM or UMTS mobile phones, comprises a signal scaling device to change the gain of the transmit signal. This signal scaling device may be provided in the analog and/or digital part of the transmission path.

A lot of signal scaling devices adapted to gain changes in the digital domain have been proposed. Most of them are multipliers in which the data signals and the chosen gain are binary multiplied via "shift-add-store" procedures. Others are based on look-up tables in which all possible pre-computed values are stored and chosen according to selected addresses. Certain of these devices implement algorithms based on signal processing in the logarithmic domain to reduce the multiplication to a simple binary addition, which is convenient in case of audio or communication signals for which the gain is often given in decibel (dB).

Some signal scaling devices adapted to the gain changes in the analog domain have also been proposed. Such a scaling can either be done in a current mode or in a voltage mode. Some of these devices are based on current scaling via transistor replicas and current mirrors. Others are based on standard operational amplifier architectures comprising resistor or capacitor ratios as gain determining components, as described, for instance, in the document of B. Razavi, "Design of analog CMOS integrated circuits", McGraw-Hill, New York, 2001.

In both analog and digital domains, the accuracy of the gain change is generally limited to the quantization level used in the basic operations that are involved, i.e., the finite word length in the digital domain or the mismatch/finite component resolution in the analog domain. Therefore these devices may present a low accuracy, which is not satisfactory, or a high complexity with respect to architecture, chip area and/or computation.

BRIEF SUMMARY

So, the object of this invention is to improve the situation.

For this purpose, it provides a signal scaling device, dedicated to the gain changes in the transmission path of a wireless communication equipment, and comprising a processing means adapted to receive a phase and/or amplitude modulated signal to transmit in order to multiply it with a chosen complex gain in order to output this phase and/or amplitude modulated signal with a chosen scaled amplitude and a chosen phase offset.

In other words the invention offers to use a complex-type signal scaling for signals invariant to constant phase offsets, i.e., for all standard carrier modulated transmission schemes used in mobile communications such as GMSK and 8PSK, for instance. By exploiting the property of phase invariance, a high accuracy signal scaling can be achieved with a low or medium implementation complexity.

When the phase and/or amplitude modulated signal is equal to I+jQ, where I is an in-phase component signal and Q is a quadrature component signal, and when the complex gain is equal to $k_1+jk_2$, where $k_1$ and $k_2$ are chosen (positive) gain coefficients, the scaled amplitude advantageously depends on a gain factor equal to $(k_1^2+k_2^2)^{1/2}$, and the phase offset is equal to $\arctan(k_2/k_1)$.

In this case, the gain coefficient $k_j$ (where j=1,2) may be equal, for instance, to $$\sum_{i=-b}^{B-1} a_{i,j} 2^i,$$

where $a_{i,j}$ is a bit coefficient equal either to 0 or 1, b is a number of bits representing the fractional part of a chosen binary number n from which a dynamic range value is built, and B is a number of bits representing the integer part of said chosen binary number n. Then the processing means may comprise i) a selection means arranged to output the bit coefficients $a_{i,j}$ defining the chosen gain coefficients $k_1$ and $k_2$ and ii) a scaling means fed with the in-phase component signal I and the quadrature component signal Q of the phase and/or amplitude modulated signal to transmit and arranged to output the phase and/or amplitude modulated signal with a scaled amplitude depending on the outputted bit coefficients $a_{i,j}$.

The invention also provides a baseband and audio interface device, for a transmission path of a wireless communication equipment, comprising a signal scaling device such as the one above introduced.

When the scaling device is digitally implemented, it can also be part of the Baseband device (comprising the Digital Signal Processor (DSP) and the controller).

The invention also provides a radiofrequency (RF) device, for a transmission path of a wireless communication equipment, comprising a signal scaling device such as the one above introduced.

The invention also provides a wireless communication equipment comprising a transmission path having a baseband device such as the one above introduced, a baseband and audio interface device such as the one above introduced and/or a radiofrequency device such as the one above introduced.

Such an equipment may be a mobile phone, for instance.

BRIEF DESCRIPTION OF THE SEVERAL VIEWS OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DETAILED DESCRIPTION

Figure 1:
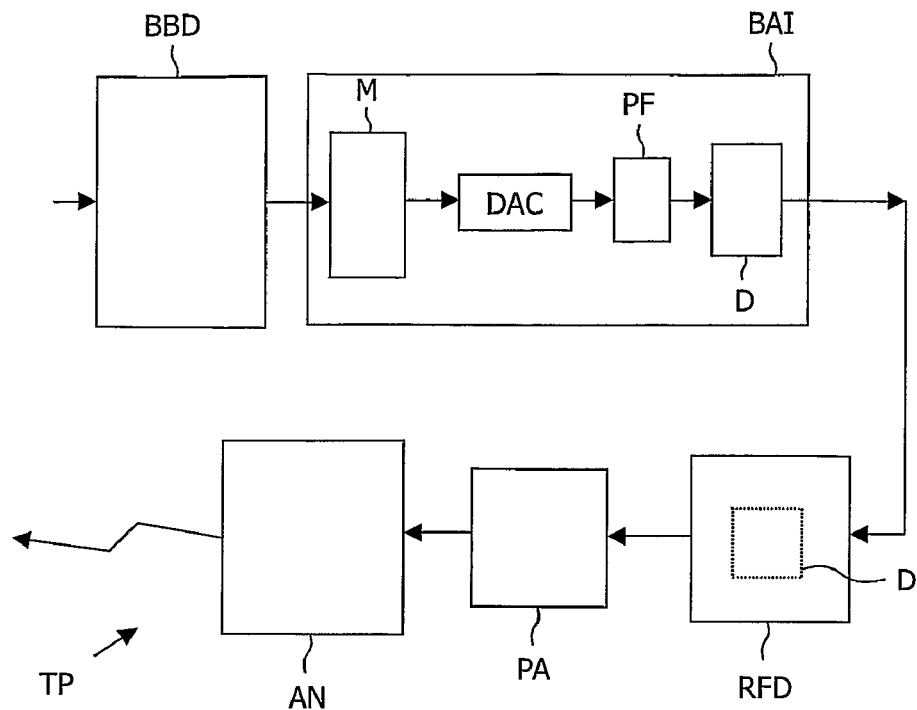
FIG. 1 schematically illustrates an example of transmission path comprising a signal scaling device according to the invention, FIG. 2 schematically illustrates a first example of embodiment of a digital signal scaling device according to the invention.

As it is schematically illustrated in FIG. 1 the transmission path of a wireless communication equipment mainly comprises a digital baseband processor (or device) BBD, a baseband and audio interface device BAI, a radiofrequency (RF) device RFD and a power amplifier PA.

In the following description it will be considered that the wireless communication equipment is a mobile phone, for instance a GSM/GPRS one or a UMTS one, adapted to transmit (and receive) phase and/or amplitude modulated signals. But the invention is not limited to this kind of equipment. It may be also a laptop or a PDA (Personal Digital Assistant) comprising a communication device, for instance.

For the transmit direction the digital baseband processor mainly comprises a digital signal processor (DSP) and a controller device (e.g., ARM) interfacing to the baseband and audio interface device BAI. The baseband and audio interface device BAI mainly comprises a modulator M, a digital to analog converter DAC and a postfilter PF interfacing to the radiofrequency device RFD. The modulator M may be, for instance, a joint 8PSK/GMSK I/Q modulator adapted to switch in multimode operation from a GMSK modulation scheme to an 8PSK modulation scheme and vice versa in consecutive time slots of a GSM frame. But the invention is not limited to this kind of switching which may require a switching between linear and non-linear modes of the power amplifier PA. Indeed this invention generally applies to any switching schemes of modulators. The transmit section of the radiofrequency device RFD mainly comprises filters, gain stages, oscillators and mixers. The power amplifier PA is connected to a radiofrequency antenna AN.

The digital baseband processor BBD, the BAI and the radiofrequency (RF) device RFD may be defined on the same chip, or on separate chips, and any combination of two of these three devices may be also defined on the same chip. So, they may be connected one to the other in a "chip-to-chip connection mode" or in a "block-to-block connection mode" (when they are integrated on the same chip).

Usually the transmission path comprises at least one gain stage or signal scaling device D which may be located inside the baseband and audio interface device BAI (in a digital or analog form) and/or in the radiofrequency device RFD (preferably in an analog form).

The invention aims at providing a signal scaling device D offering a high accuracy signal scaling with a limited complexity. As illustrated in FIG. 1, a device D (or gain stage) according to the invention may be located inside the baseband and audio interface device BAI and/or in the radiofrequency device RFD. Moreover and as it will be described below, a device D according to the invention may have a digital form or an analog form.

The signal scaling device D (hereafter the "device D") comprises at least a processing module PM arranged to multiply every phase and/or amplitude modulated signal it receives (and which must be transmitted) with a chosen complex gain in order to output it with a chosen scaled amplitude and a chosen phase offset.

To facilitate the understanding of the invention, the mathematical definition of the complex multiplication will be recalled hereafter.

Let $X_1 = r_1(\cos\theta_1 + j\sin\theta_1)$ and $x_2 = r_2(\cos\theta_2 + j\sin\theta_2)$, in polar form. Then the product $X = x_1 x_2$ can be rewritten as follows:

$$X = x_1 x_2 = r_1 r_2 [\cos(\theta_1 + \theta_2) + j\sin(\theta_1 + \theta_2)] \quad (eq.\ 1)$$

Taking absolute values and arguments on both sides of equation (eq.1) leads to:

$$|x_1 x_2| = |x||x| \quad (eq.2a)$$

$$\arg(x_1 x_2) = (\arg(x_1) + \arg(x_2)) \bmod ulo\ 2\pi \quad (eq.2b)$$

Equations (eq.2a) and (eq.2b) hold for the multiplication of any real or complex number. Therefore, assuming that $X_1$ is a phase and/or amplitude modulated signal to transmit with in-phase component I and quadrature component Q ($x_1 = I + jQ$), with $r_1 = (I^2 + Q^2)^{1/2}$, and $x_2$ is a complex gain ($x_2 = k_1 + jk_2$), with $r_2 = (k_1^2 + k_2^2)^{1/2}$, then the absolute value of the product X of the modulated signal and complex gain equals the product of the absolute values of its individual components and the resulting argument follows from the summation of the individual arguments.

So, when the modulated signal to transmit is not affected by any constant phase offset from the receiver point of view, which is for example the case for any phase modulated signal, the product X of this signal $X_1$ with a chosen complex gain $x_2$ results in a chosen amplitude signal scaling ($r_2 = (k_1^2 + k_2^2)^{1/2}$) with a fixed phase offset (arg $x_2 = \arctan(k_2/k_1)$). In cartesian coordinates the product $X = x_1 x_2$ can be rewritten as follows:

$$X = x_1 x_2 = (I + jQ)(k_1 + jk_2) = (Ik_1 - Qk_2) + j(Ik_2 + Q \cdot k_1) \quad (eq.3)$$

This multiplication may be implemented in a digital form as well as in an analog form. Moreover, this multiplication may be implemented in a simple form or in a differential form.

In the simple form one starts from the modulated I/Q signal to transmit, defined by its couple of components $\{I, Q\}$, to get a modulated I/Q signal with a scaled amplitude, defined by a couple of components $\{I_T, Q_T\}$, with $I_T = Ik_1 - Qk_2$ and $Q_T = Ik_2 + Qk_1$, according to equation (eq.3).

In the differential form one starts from the modulated I/Q signal to transmit, defined by a quadruplet of differential components $\{I^+, Q^+, I^-, Q^-\}$, where $I^+ = -I^-$ and $Q^+ = -Q^-$ (the common mode voltage is assumed to be zero in this example for the sake of clarity), to get a modulated I/Q signal with a scaled amplitude, defined by a quadruplet of components $\{I_T^+, Q_T^+, I_T^-\}$, with $I_T^+ = I^+k_1 + Q^{-k}_2$, $Q_T^+ = I^+k_2 + Q^+k_1$, $I_T^- = I^-k_1 + Q^{+k}_2$, $Q_T^- = I^{-k}_2 + Q^-k_1$, according to equation (eq.3).

In doing so, additional signal inversions can be omitted.

The components $k_1$ and $k_2$ defining the gain may be quantized to n bit levels, with $n \geq 1$.

For instance, one can choose n=3, a multiplication range of [−9; 3] dB, and a resolution of 1 dB per gain step. Now if the gain K (in dB) is equal to $20\log_{10}((k_1^2 + k_2^2)^{1/2})$, with $k_1 = k_2 =$ [1; 0.875; 0.75; . . . ; 0.25; 0.125], then after sorting the results and keeping the gain values which are closest to the 1 dB resolution gain step, one gets the following gain values K=[−9.03; −8.06; −6.92; −5.75; −5.05; −4.08; −3.01; −2.04; −1.07; 0.07; 0.97; 1.94; 3.01] dB. A gain accuracy of 0.25 dB is achieved for the whole range of K, and a gain accuracy of 0.05 dB is achieved for the gain values K belonging to [−5; 3] dB.

It is recalled that the range of non-negative integers n that can be represented by B bits in a fixed point representation is given by $0 \leq \eta \leq 2^B - 1$ and the range of positive fractions η that can be represented by b bits is given by $0 \leq \eta \leq 1 - 2^{-b}$. Moreover, if $\eta_{max}$ and $\eta_{min}$ designate respectively the maximum and the minimum values of the numbers that can be represented in a B-bit-fixed-point representation, then the dynamic range R is given by $R=\eta_{max}-\eta_{min}$ and the resolution (or quantization level) of the representation is defined by $\delta=R/(2^B-1)$ or $R/(2^b-1)$. $\delta$ is only defined for B and b not equal to zero.

More, the decimal equivalent of a binary number n consisting of B integer bits and b fractional bits is given by $$\sum_{i=-b}^{B-1} a_i 2^i,$$

where each bit $a_i$ is equal either to 0 or to 1. Hence the gain K can be rewritten as follows:

$$K = \left\{ \left(\sum_{i=-b}^{B-1} a_{i,1} 2^i\right)^2 + \left(\sum_{i=-b}^{B-1} a_{i,2} 2^i\right)^2 \right\}^{1/2} \quad (eq.\ 4)$$

For instance, when B=1 and b=3, $\eta$ is ranging from 1 to 0.125, and thus R is equal to 0.875 and S is equal to 0.125. This example adds an unrequired accuracy and complexity because the case $k_j=0$ (with j=1,2) does not exist. So it is more advantageous to set B to 0, to keep b equal to 3, and to replace the case $k_j=0$ with the case $k_j=1$. In this case, equation (eq.4) can be rewritten as follows:

$$K = \left\{ \left(\sum_{i=-3}^{-1} a_{i,1} 2^i\right)^2 + \left(\sum_{i=-3}^{-1} a_{i,2} 2^i\right)^2 \right\}^{1/2}, \quad (eq.\ 5)$$

with $$\sum_i a_{i,j} 2^i = 1 \text{ if all } a_{i,j} = 0$$

Figure 2:
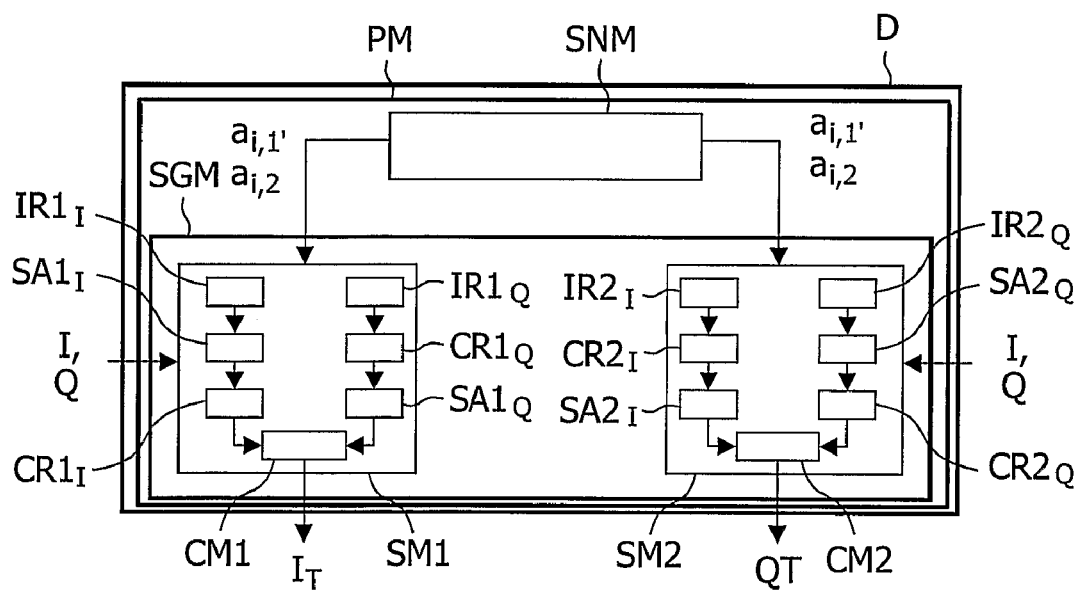
Figure 3:
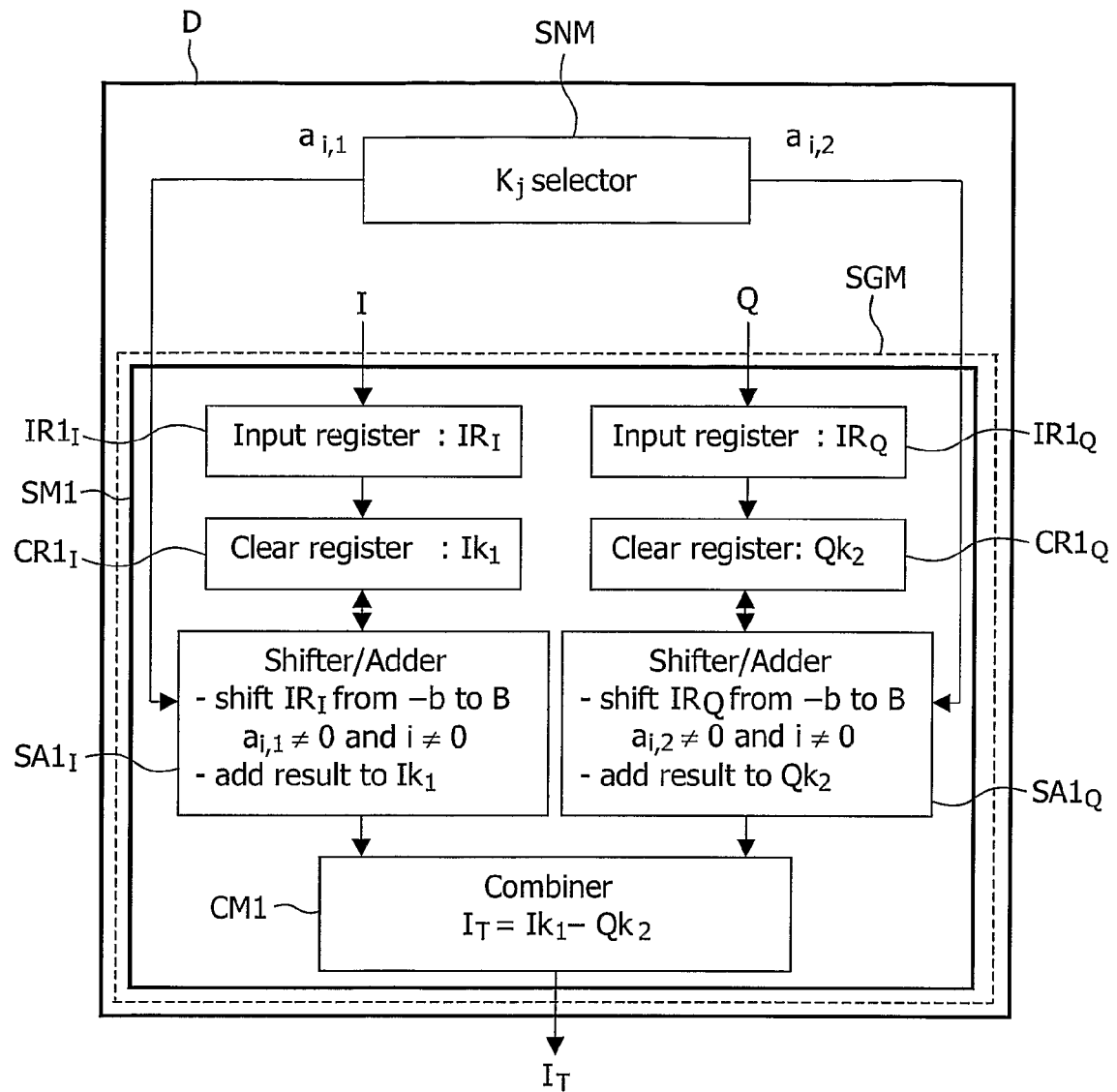
FIG. 3 illustrates in more detail a part of the signal scaling device of FIG. 2, FIG. 4 schematically illustrates a second example of embodiment of an analog signal scaling device according to the invention.

One will now refer to FIGS. 2 and 3 to describe a first example of embodiment of a digital signal scaling device D according to the invention, adapted to implement equation (eq.5).

In this first example the device D is a digital circuit comprising a selection module SNM arranged to select the chosen gain coefficients $k_j$ (j=1,2) in order to output the bit coefficients $a_{i,j}$ which define them, and a scaling module SGM fed with the in-phase component signal I and the quadrature component signal Q of the phase and/or amplitude modulated signal to transmit and with the bit coefficients $a_{i,j}$, and arranged to output the components $I_T$ and $Q_T$ defining the phase and/or amplitude modulated signal after amplitude scaling.

For instance, the scaling module SGM may be divided into a first sub-module SM1 fed with I and Q and dedicated to $I_T$ and a second sub-module SM2 also fed with I and Q but dedicated to $Q_T$.

The first sub-module SM1 comprises, for instance:

preferably a first input register $IR1_I$ for storing the in-phase component signal I to transmit, a first clear register $CR1_I$ for storing the value of the product of I by $k_1$ ($Ik_1$), a first shifter/adder $SA1_I$ implementing equation (eq.5). More precisely, it is arranged to shift successively the content of the first input register $IR1_I$ by i=−b to B−1 bits, and then adds the result of a particular shift i to the value stored in the first clear register $CR1_I$ if the corresponding value $a_{i,1}$ is one, preferably a second input register $IR1_q$ for storing the quadrature component signal Q to transmit, a second clear register $CR1_q$ for storing the value of the product of Q by $k_2$ ($Qk_2$), a second shifter/adder $SA1_q$ implementing equation (eq.5). More precisely, it is arranged to shift successively the content of the second input register $IR1_q$ by i=−b to B−1 bits, and then adds the result of a particular shift i to the value stored in the second clear register $CR1_q$ if the corresponding value $a_{i,2}$ is one, and a first calculation module CM1 for subtracting the content of the second clear register $CR1_q$ from the content of the first clear register $CR1_I$ ($Ik_1-Qk_2$), in order to output an in-phase component signal with the chosen scaled amplitude $I_T$.

The second sub-module SM2 is similar to the first one SM1. It comprises, for instance:

preferably a first input register $IR2_I$ for storing the in-phase component signal I to transmit, a first clear register $CR2_I$ for storing the value of the product of I by $k_2$ ($Ik_2$), a first shifter/adder $SA2_I$ implementing equation (eq.5). More precisely, it is arranged to shift the content of the first input register $IR2_I$ by i=−b to B−1 bits, and then adds the result of a particular shift i to the value stored in the first clear register $CR2_I$ if the corresponding value $a_{i,1}$ is one, preferably a second input register $IR2_Q$ for storing the quadrature component signal Q to transmit, a second clear register $CR2_Q$ for storing the value of the product of Q by $k_1$ ($Qk_1$), a second shifter/adder $SA2_Q$ implementing equation (eq.5). More precisely, it is arranged to shift the content of the second input register $IR2_Q$ by i=−b to B−1 bits, and then adds the result of a particular shift i to the value stored in the second clear register $CR2_Q$ if the corresponding value $a_{i,2}$ is one, and a second calculation module CM2 for adding the content of the second clear register $CR2_Q$ to the content of the first clear register $CR2_I$ ($Ik_2+Qk_1$), in order to output a quadrature component signal with the chosen scaled amplitude $Q_T$.

A shift is a multiplication or a division by a factor equal to 2 depending on its sign (or direction). More precisely, a shift in the right direction (">>1") corresponds to a division by 2, while a shift in the left direction ("<<1") corresponds to a multiplication by 2.

For instance, if the gain step is equal to 0.25 then a multiplication of a value I by $k_1$=0.25 corresponds to two right shifts (">>2") which gives I/4. For instance "I>>2−Q>>2" corresponds to I/4−Q/4, "I>>2+I>>3−Q>>1" corresponds to I/4+I/8−Q/2, i.e. 3I/8−Q/2, and "I+Q>>1" corresponds to I+Q/2.

The table below gives an example of the correspondence between different gain values, the corresponding gain coefficients $k_1$ and $k_2$, and the shift action(s) required for $I_T$ and $Q_T$ calculations:

| K (dB) | $k_1$ | $k_2$ | $I_T$ calculation | $Q_T$ calculation |
|---|---|---|---|---|
| −9.03 | 0.25 | 0.25 | I >> 2 − Q >> 2 | I >> 2 + Q >> 2 |
| −8.06 | 0.375 | 0.125 | I >> 2 + I >> 3 − Q >> 3 | I >> 3 + Q >> 2 + Q >> 3 |
| −6.92 | 0.375 | 0.25 | I >> 2 + I >> 3 − Q >> 2 | I >> 2 + Q >> 2 + Q >> 3 |
| −5.75 | 0.5 | 0.125 | I >> 1 − Q >> 3 | I >> 3 + Q >> 1 |
| −5.05 | 0.5 | 0.250 | I >> 1 − Q >> 2 | I >> 2 + Q >> 1 |

-continued

| K (dB) | $k_1$ | $K_2$ | $I_T$ calculation | $Q_T$ calculation |
|---|---|---|---|---|
| −4.08 | 0.5 | 0.375 | I >> 1 − Q >> 2 − Q >> 3 | I >> 2 + I >> 3 + Q >> 1 |
| −3.01 | 0.5 | 0.5 | I >> 1 − Q >> 1 | I >> 1 + Q >> 1 |
| −2.04 | 0.75 | 0.25 | I >> 1 + I >> 2 − Q >> 2 | I >> 2 + Q >> 1 + Q >> 2 |
| −1.07 | 0.875 | 0.125 | I >> 1 + I >> 2 + I >> 3 − Q >> 3 | I >> 3 + Q >> 1 + Q >> 2 + Q >> 3 |
| −0.07 | 1 | 0.125 | I − Q >> 3 | I >> 3 + Q |
| 0.97 | 1 | 0.5 | I − Q >> 1 | I >> 1 + Q |
| 1.94 | 1 | 0.75 | I − Q >> 1 − Q >> 2 | I >> 2 + Q >> 1 + Q |
| 3.01 | 1 | 1 | I − Q | I + Q |

With this digital implementation, the main functions performed by the shifter/adder SA1 or SA2 are simple shift and add operations, which can be implemented in hardware or in software.

Figure 4:
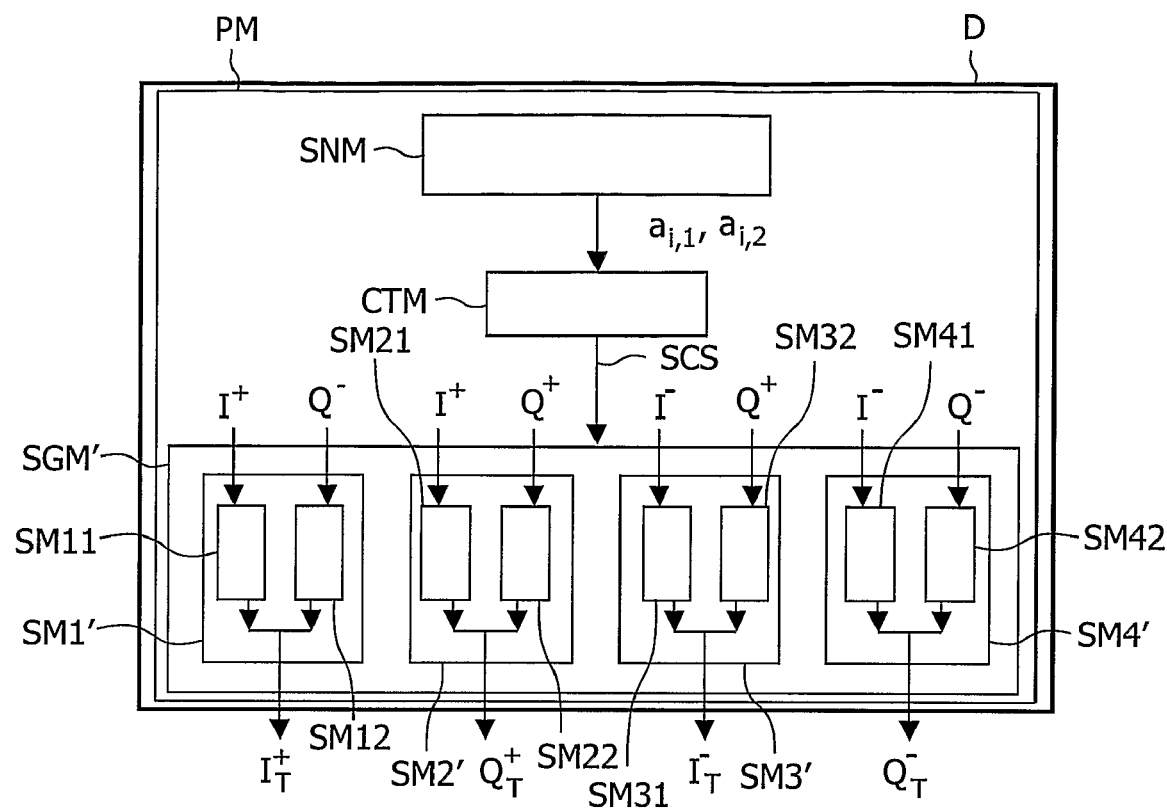
Figure 5:
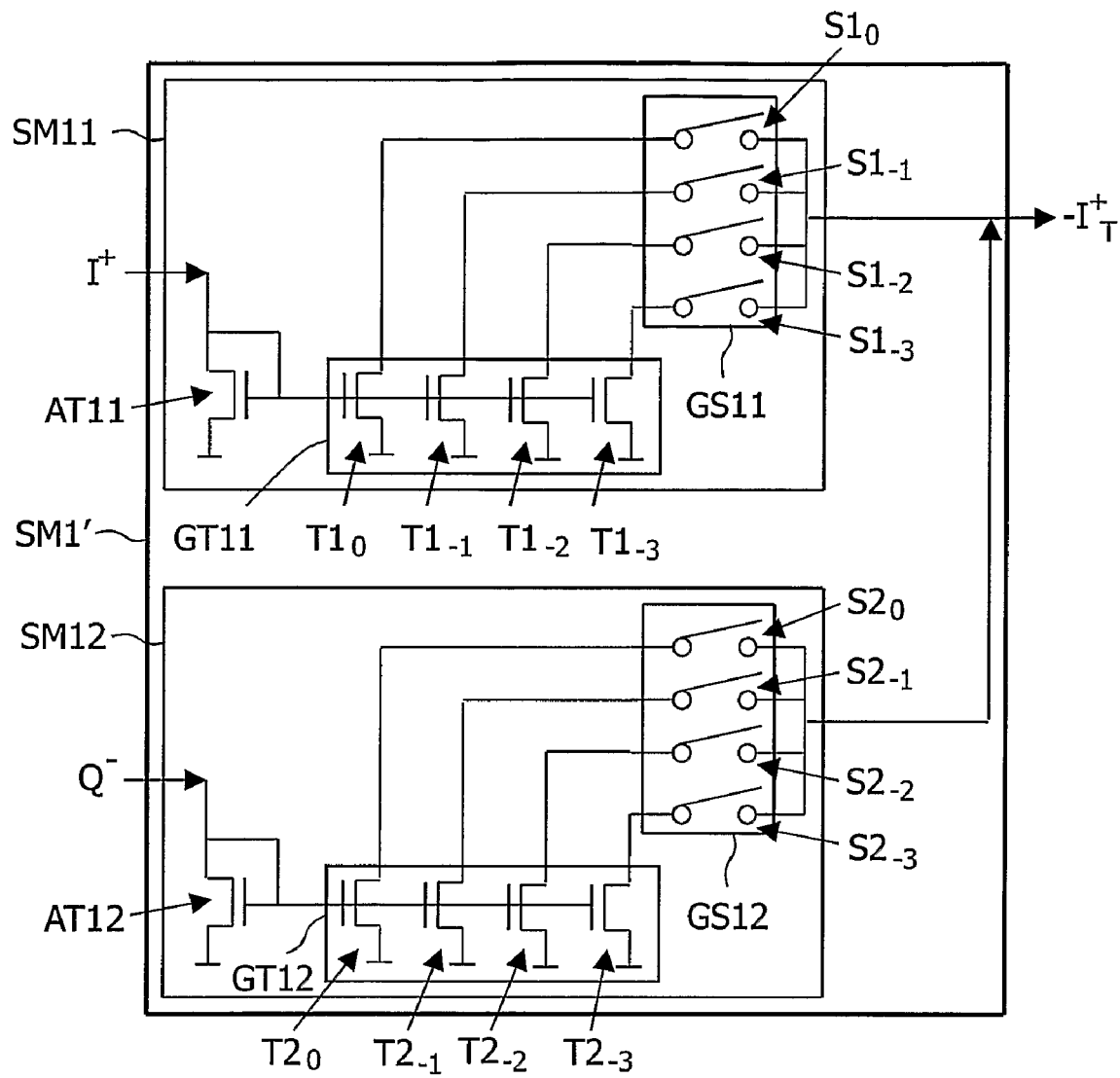
FIG. 5 illustrates in more detail a part of the signal scaling device of FIG. 4, FIG. 6 schematically illustrates a third example of embodiment of an analog signal scaling device according to the invention.

One will now refer to FIGS. 4 and 5 to describe a second example of embodiment of an analog signal scaling device D according to the invention, also adapted to implement equation (eq.5) but in an analog way. More precisely this second example corresponds to a current-mode implementation.

In this second example the device D is an analog circuit comprising a selection module SNM arranged to select the chosen gain coefficients $k_j$ (j=1, 2) in order to output the bit coefficients $a_{i,j}$ which define them, a control module CTM arranged to convert the bit coefficients $a_{i,j}$ in switch command signals SCS depending on their values (0 or 1) and a scaling module SGM fed with the differential in-phase component signals $I^+$ and $I^-$ and the quadrature component signals $Q^+$ and $Q^-$ of the phase and/or amplitude modulated signal to transmit and with the switch command signals SCS, and arranged to output the differential components $I_T^+$, $I_T^-$, $Q_T^+$ and $Q_T^-$ defining the phase and/or amplitude modulated signal after amplitude scaling.

For instance, the scaling module SGM' may be divided in a first sub-module SM1' fed with $I^+$ and $Q^-$ and outputting $I_T^+$, a second sub-module SM2' fed with $I^+$ and $Q^+$ and outputting $Q_T^+$, a third sub-module SM3' fed with $I^-$ and $Q^+$ and outputting $I_T^-$, and a fourth sub-module SM4" fed with $I^-$ and $Q^-$ and outputting $Q_T^-$.

For instance and as illustrated in FIG. 5, the first sub-module SM1' comprises a first entity SM11 dedicated to the amplitude scaling of $I^+$ and a second entity SM12 dedicated to the amplitude scaling of $Q^-$.

The first entity SM11 comprises, for instance, a first group GS11 of switches $S1_i$ (here i=−3 to 0) respectively associated to the bit coefficients $a_{i,1}$ ($a_{-3,1}$ to $a_{0,1}$). Each switch $S1_i$ comprises an input and an output and is adapted to be set in an on state (allowing the current to flow) or an off state (forbidding the current to flow) depending on the value of the corresponding switch command signal SCS provided by the control module CM. Moreover, the outputs of these switches $S1_i$ are all connected to a first output terminal.

The first entity SM11 also comprises, for instance, a first group GT11 of field effect transistors $T1_i$ (for instance in MOS technology) each having an insulated gate. All the insulated gates of the transistors $T1_i$ are connected in series to a first input terminal fed with a first in-phase modulated signal $I^+$. Moreover, each transistor $T1_i$ has a drain connected to the input of one of the switches $S1_i$ of the first group GS11. Furthermore these transistors $T1_i$ have different aspect ratios (or area ratios). For instance the first one $T1_{-3}$ has an aspect ratio of 1, the second one $T1_{-2}$ has an aspect ratio of 2, the third one $T1_{-1}$ has an aspect ratio of 4, and the fourth one $T1_0$ has an aspect ratio of 8.

Preferably and as illustrated, the first entity SM11 further comprises a first additional field effect transistor AT11 which is preferably identical to the transistor $T1_0$ having the biggest aspect ratio (here equal to 8). The insulated gate of the first additional transistor AT11 is connected to its own drain and to the first input terminal which is fed with the first in-phase modulated signal $I^+$. So this first additional transistor AT11 is a "diode connected transistor".

This additional transistor AT11 sinks any current introduced to its drain and develops a chosen gate-source voltage $V_{GS}$. All the transistors $T1_i$ connected to its insulated gate share the same gate-source voltage $V_{GS}$. Therefore any transistor $T1_i$ having the same aspect ratio than the additional transistor AT11 develops the same current. It is recalled that a current mirror copies an input current onto an output without sign change when this input current is sunk into the diode connected transistor and the output current is sunk into the output transistor.

Hence, when the control module CM sends an on state switch command signal SCS to the switch $S1_0$ of the first group GT11, $I^+$ will flow through it (and $I^+=−I_T^+$)' when the control module CM sends an on state switch command signal SCS to the switch $S1_{-1}$ of the first group GT11, $I^+/2$ will flow through it (and $I^+/2=−I_T^+/2$), and when the control module CM send an on state switch command signal SCS to the switch $S1_{-2}$ of the first group GT11, $I^+/4$ will flow through it, etc. All currents flowing through switches in their on state will then be summed up to contribute to $I_T^+$. As mentioned above, the diode connected transistors sinks a current into ground and the output current sinks also a current into ground. This is the normal operation of the current mirror function.

The second entity SM12 is similar to the first entity SM11. It comprises, for instance, a second group GS12 of switches $S2_i$ (here i=−3 to 0) respectively associated to the bit coefficients $a_{i,2}$ ($a_{-3,2}$ to $a_{0,2}$). Each switch $S2_i$ comprises an input and an output and is adapted to be set in an on state or an off state depending on the value of the corresponding switch command signal SCS provided by the control module CM. Moreover, the outputs of these switches $S2_i$ are all connected to the first output terminal.

The second entity SM12 also comprises, for instance, a second group GT12 of field effect transistors $T2_i$ (for instance in MOS technology) each having an insulated gate. All the insulated gates of the transistors $T2_i$ are connected in series to a second input terminal fed with a first quadrature modulated signal $Q^-(Q^+=−Q^-)$. Moreover, each transistor $T2_i$ has a drain connected to the input of one of the switches $S2_i$ of the second group GS12. Furthermore these transistors $T2_i$ have different aspect ratios. In this example the first one $T2_{-3}$ has an aspect ratio of 1, the second one $T2_{-2}$ has an aspect ratio of 2, the third one $T2_{-1}$ has an aspect ratio of 4, and the fourth one $T2_0$ has an aspect ratio of 8.

Preferably and as illustrated, the second entity SM12 further comprises a second additional field effect transistor AT12 which is preferably identical to the transistor $T2_0$ having the biggest aspect ratio (here equal to 8). The insulated gate of the second additional transistor AT12 is connected to its own drain and to the second input terminal which is fed with the first quadrature modulated signal $Q^-$.

The second sub-module SM2' is identical to the first one SM1'. It comprises, for instance, a first entity SM21 [comprising GS21, GT21, AT21] dedicated to the amplitude scaling of $I^+$ and a second entity SM22 [comprising GS22, GT22, AT22] dedicated to the amplitude scaling of $Q^+$. The output of the first SM21 and second SM22 entities are both connected to a second output terminal which outputs the differential component $Q_T^+$.

The third sub-module SM3' is also identical to the first one SM1'. It comprises, for instance, a first entity SM31 [comprising GS31, GT31, AT31] dedicated to the amplitude scaling of I$^-$ and a second entity SM32 [comprising GS32, GT32, AT32] dedicated to the amplitude scaling of Q$^+$. The output of the first SM31 and second SM32 entities are both connected to a third output terminal which outputs the differential component $I_T^-$.

Finally the fourth sub-module SM4' is also identical to the first one SM1'. It comprises, for instance, a first entity SM41 [comprising GS41, GT41, AT41] dedicated to the amplitude scaling of I$^-$ and a second entity SM42 [comprising GS42, GT42, AT42] dedicated to the amplitude scaling of Q$^-$. The output of the first SM41 and second SM42 entities are both connected to a fourth output terminal which outputs the differential component $Q_T^-$.

In this second example of device D, the input phase and/or amplitude modulated signal is a current and the scaling is done by taking advantage of the current mirror operation, which may also invert the sign of the signal when it is required.

Figure 6:
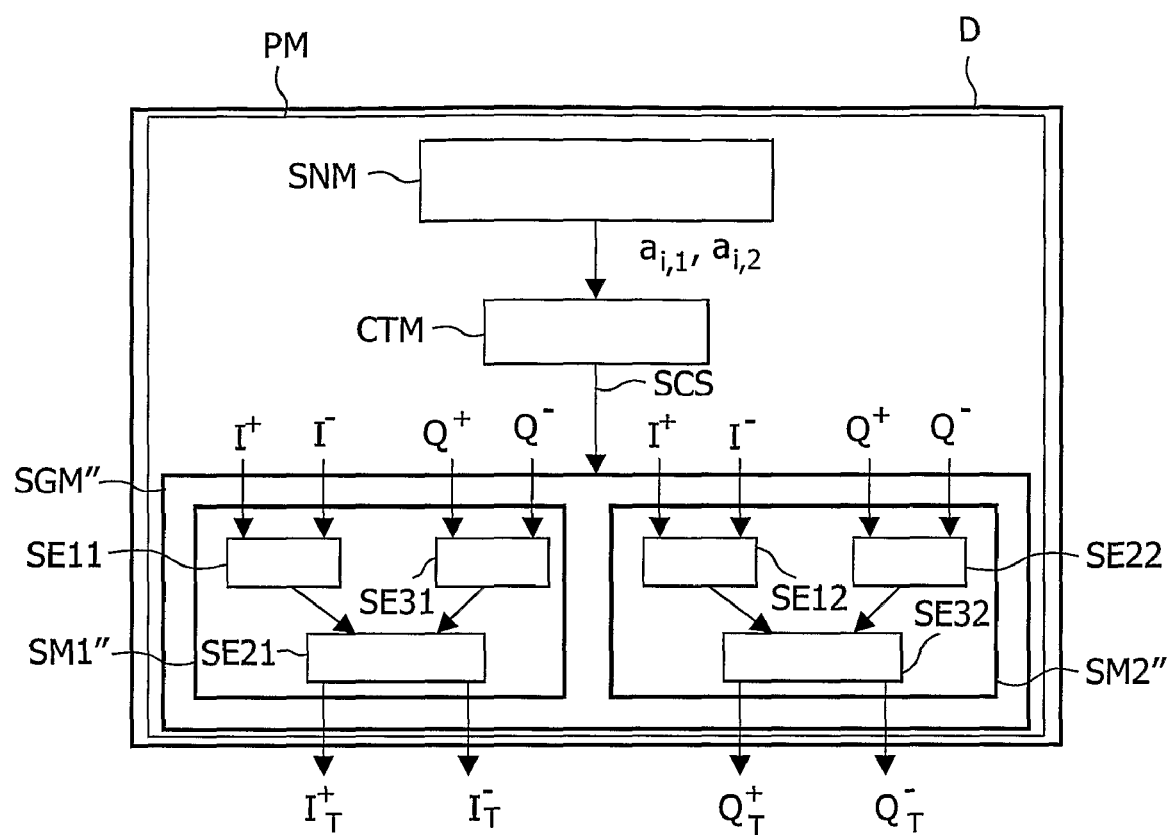
Figure 7:
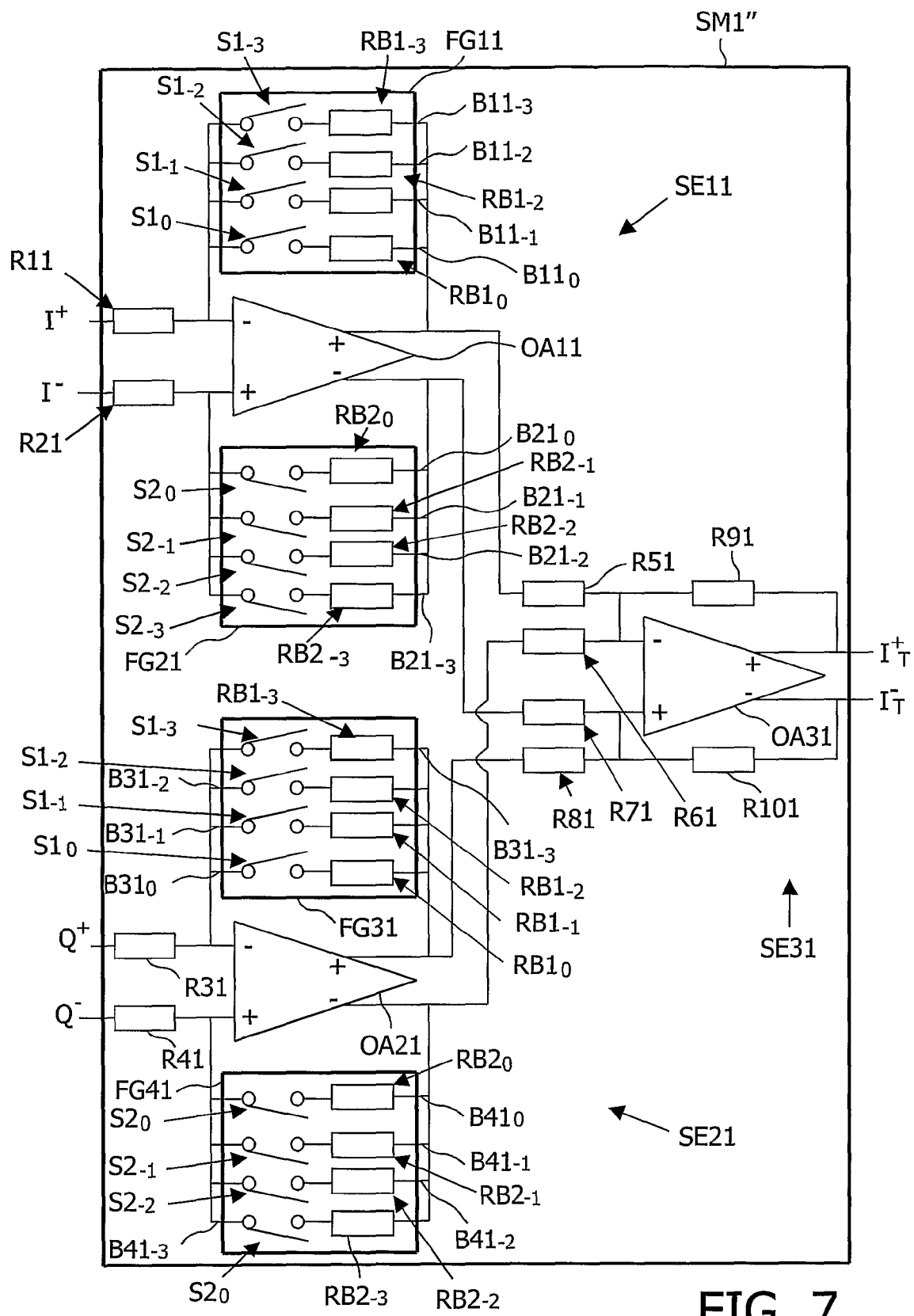
FIG. 7 illustrates in more detail a part of the signal scaling device of FIG. 6.

One will now refer to FIGS. 6 and 7 to describe a third example of embodiment of an analog signal scaling device D according to the invention, also adapted to implement equation (eq.5) but in an analog way. More precisely this third example corresponds to a voltage-mode implementation.

In this third example the device D is an analog circuit comprising a selection module SNM arranged to select the chosen gain coefficients $k_j$ (j=1, 2) in order to output the bit coefficients $a_{i,j}$ which define them, a control module CTM arranged to convert the bit coefficients $a_{i,j}$ in switch command signals SCS depending on their values (0 or 1) and a scaling module SGM" fed with the differential in-phase component signals I$^+$ and I$^-$ and the quadrature component signals Q$^+$ and Q$^-$ of the phase and/or amplitude modulated signal to transmit and with the switch command signals SCS, and arranged to output the differential components $I_T^+$, $I_T^-$, $Q_T^+$ and $Q_T^-$ defining the phase and/or amplitude modulated signal after amplitude scaling.

For instance, the scaling module SGM" may be divided into a first sub-module SM1" fed with I$^+$, I$^-$, Q$^+$ and Q$^-$ and outputting $I_T^+$, and $I_T^-$, and a second sub-module SM2" also fed with I$^+$, I$^-$, Q$^+$ and Q$^-$ and outputting $Q_T^+$, and $Q_T^-$.

For instance and as illustrated in FIG. 7, the first sub-module SM1" may be divided into a first entity SE11, a second entity SE21 and a third entity SE31.

The first entity SE11 comprises, for instance, a first group FG11 of branches B11$_i$ (here i=−3 to 0) mounted in parallel. Each branch B11$_i$ comprises a switch S1$_i$ associated to one of the bit coefficients $a_{i,1}$ ($a_{-3,1}$ to $a_{0,1}$), adapted to be set in an on state or an off state depending on the value of the corresponding switch command signal SCS and connected in series to a resistor RB1$_i$ of a chosen resistance.

The first entity SE11 also comprises a second group FG21 of branches B21$_i$ (here i=−3 to 0) mounted in parallel. Each branch B21$_i$ comprises a switch S2$_i$ associated to one of the bit coefficients at, ($a_{-3}$ to $a_0$), adapted to be set in an on state or an off state depending on the value of the corresponding switch command signal SCS and connected in series to a resistor RB2$_i$ of a chosen resistance.

The first entity SE11 also comprises a first operational amplifier OA11 having an inverting input connected to the input of the branches B11$_i$ of the first group FG11 and fed with the first in-phase modulated signal I$^+$ through a first resistor R11 of a chosen resistance, a non inverting input connected to the input of the branches B21$_i$ of the second group FG21 and fed with the second in-phase modulated signal I$^-$ through a second resistor R21 of a chosen resistance, a positive output connected to the output of the branches B11$_i$ of the first group FG11, and a negative output connected to the output of the branches B21$_i$ of the second group FG21.

Here, the first operational amplifier OA11 is dedicated to the multiplication by $k_1$.

The second entity SE21 is similar to the first one SE11. It comprises a third group FG31 of branches B31$_i$ (here i=−3 to 0) mounted in parallel. Each branch B31$_i$ comprises a switch S1$_i$ associated to one of the bit coefficients $a_{i,2}$ ($a_{-3,2}$ to $a_{0,2}$), adapted to be set in an on state or an off state depending on the value of the corresponding switch command signal SCS and connected in series to a resistor RB1$_i$ of a chosen resistance.

The second entity SE21 also comprises a fourth group FG41 of branches B41$_i$ (here i=−3 to 0) mounted in parallel. Each branch B41$_i$ comprises a switch S2$_i$ associated to one of the bit coefficients $a_{i,2}$ ($a_{-3,2}$ to $a_{0,2}$), adapted to be set in an on state or an off state depending on the value of the corresponding switch command signal SCS and connected in series to a resistor RB2$_i$ of a chosen resistance.

The second entity SE21 also comprises a second operational amplifier OA21 having an inverting input connected to the input of the branches B31$_i$ of the third group FG31 and fed with the first quadrature modulated signal Q$^+$ through a third resistor R31 of a chosen resistance, a non inverting input connected to the input of the branches B41$_i$ of the fourth group FG41 and fed with the second quadrature modulated signal Q$^-$ through a fourth resistor R41 of a chosen resistance, a positive output connected to the output of the branches B31$_i$ of the third group FG31, and a negative output connected to the output of the branches B41$_i$ of the fourth group FG41.

Here, the second operational amplifier OA21 is dedicated to the multiplication by k2.

The third entity SE31 comprises, for instance, a third operational amplifier OA31 having an inverting input connected to the positive output of the first operational amplifier OA11 through a fifth resistor R51 of a chosen resistance and to the negative output of the second operational amplifier OA21 through a sixth resistor R61 of a chosen resistance, a non inverting input connected to the negative output of the first operational amplifier OA11 through a seventh resistor R71 of a chosen resistance and to the positive output of the second operational amplifier OA21 through a eighth resistor R81 of a chosen resistance, a positive output connected to its inverting input through a ninth resistor R91 of a chosen resistance for outputting the differential component $I_T^+$ (which is here equal to k1*I$^+$+k2*Q$^-$), and a negative output connected to its non inverting input through a tenth resistor R101 of a chosen resistance for outputting the differential component $I_T^-$. The third operational amplifier OA31 is used for the summation.

Preferably the first R11 to tenth R101 resistors have a same chosen resistance, which is also preferably equal to the resistance RB1$_0$ (here 1=1 to 4) of the branches B11$_0$. Still preferably the resistance RBL$_1$ of the branches B11$_{-1}$ is equal to RB1$_0$/2, the resistance RBL$_2$ of the branches B11$_{-2}$ is equal to RB1$_0$/4, and the resistance RB1$_{-3}$ of the branches B11$_{-3}$ is equal to RB1$_0$/8.

In this voltage mode example the voltage input is scaled by using standard operational amplifier circuitry.

For instance, when the control module CM sends an on state switch command signal SCS to the switch S1$_0$ of the first group FG11, any voltage seen at the input terminal of I$^+$ is (−8/8) mirrored to the positive output of the first operational amplifier OA11. When the control module CM sends an on state switch command signal SCS to the switch S1$_{-1}$ of the first group FG11, any voltage seen at the input terminal of I$^+$ is (−4/8) mirrored to the positive output of the first operational amplifier OA11. When the control module CM sends an on state switch command signal SCS to the switches S1$_0$ and S1$_{-1}$ of the first group FG11, any voltage seen at the input terminal of I$^+$ is [−((4*8)/(8+4))/8=−1/3] mirrored to the positive output of the first operational amplifier OA11. This results from the resistance ratios of RB1$_0$/R11, RB1$_{-1}$/R11 and ((RB1$_0$*RB1$_{-1}$)/(RB1$_0$+RB1$_{-1}$))/R11, according to the above cited resistance values.

The second sub-module SM2" is identical to the first one SM1". It comprises, for instance, a first entity SE12 [comprising FG12, B12$_i$, OA12, R12, R22, FG22, B22$_i$] dedicated to the amplitude scaling of I$^-$ (through FG12) and I$^+$ (through FG22), a second entity SE22 [comprising FG32, B32$_i$, OA22, R32, R42, FG42, B42$_i$] dedicated to the amplitude scaling of Q$^+$ (through FG32) and Q$^-$ (through FG42), and a third entity SE32 [comprising OA32, R52, R62, R72, R82, R92, R102] outputting the differential components Q$_T^-$ and Q$_T^+$ respectively on the negative and positive outputs of the third operational amplifier OA32. In this case, the first operational amplifier OA12 is dedicated to the multiplication by k$_2$ while the second operational amplifier OA22 is dedicated to the multiplication by k$_1$.

The invention is not limited to the embodiments of signal scaling device (D), baseband and audio interface device (BAI), radio frequency device (RFD) and wireless communication equipment described above, only as examples, but it encompasses all alternative embodiments which may be considered by one skilled in the art within the scope of the claims hereafter.

The invention claimed is:

1. A signal scaling device comprising:
   a receiver adapted to receive a phase and/or amplitude modulated signal to be transmitted; and
   a processing means operably coupled to the receiver and arranged to multiply said phase and/or amplitude modulated signal with a chosen complex gain in order to output said phase and/or amplitude modulated signal with a chosen scaled amplitude and a chosen phase offset, wherein said phase and/or amplitude modulated signal is equal to I+jQ, where I is an in-phase component signal and Q is a quadrature component signal, said complex gain equal to k$_1$+jk$_2$, where k$_1$ and k$_2$ are chosen gain coefficients, and wherein said chosen scaled amplitude depends on a gain factor equal to (k$_1^2$+k$_2^2$)$^{1/2}$, and said phase offset is equal to arctan(k$_2$/k$_1$), and wherein said gain coefficient k$_j$ is equal to $$\sum_{i=-b}^{B-1} a_{i,j} 2^i,$$

where j=1,2 and where a$_{i,j}$ is a bit coefficient equal either to 0 or 1, b is a number of bits representing a fractional part of a chosen binary number η from which a dynamic range value is built, and B is a number of bits representing an integer part of said chosen binary number η, and wherein said processing means comprises:
   a selection means arranged to output said bit coefficients a$_{i,j}$ defining said chosen gain coefficients k$_1$ and k$_2$; and
   a scaling means fed with said in-phase component signal I and quadrature component signal Q of a phase and/or amplitude modulated signal to transmit, the scaling means arranged to output said phase and/or amplitude modulated signal with a scaled amplitude depending on said outputted bit coefficients a$_{i,j}$.

2. The signal scaling device according to claim 1, wherein said scaling means is fed with said bit coefficients a$_{i,j}$ and wherein said scaling means comprises:
   a first register means for storing said in-phase component signal I of the modulated signal to transmit:
   a first shift means for shifting content of said first input register means by I=−b to B−1 bits depending on said outputted bit coefficients a$_{i,1}$:
   a second register means for storing said quadrature component signal Q to transmit;
   a second shift means for shifting content of said second input register means by i=−b to B−1 bits depending on said outputted bit coefficients a$_{i,2}$;
   a first calculation means for subtracting content of said second register means from the content of said first input register means to output an in-phase component signal with the chosen scaled amplitude:
   a third register means for storing also said in-phase component signal I of the modulated signal to transmit:
   a third shift means for shifting content of said third register means by i=−b to B−1 bits depending on said outputted bit coefficients a$_{i,2}$;
   a fourth register means for storing also said quadrature component signal Q to transmit;
   a fourth shift means for shifting content of said fourth register means by i=−b to B−1 bits depending on said outputted bit coefficients a$_{i,1}$; and
   a second calculation means for adding the content of said third register means to the content of said fourth register means to output a quadrature component signal with the chosen scale amplitude.

3. The signal scaling device according to claim 1, further comprising a control means arranged to convert said bit coefficients a$_{i,j}$ in switch command signals depending on their values, and wherein said scaling means comprises:
   a first group of switches respectively associated to said bit coefficients a$_{i,1}$, each comprising an input and an output, and adapted to be set in an on state or an off state depending on a value of a corresponding switch command signal, the outputs of the switches of said first group being connected to a first output terminal;
   a first group of transistors each having an insulated gate and each insulated gate of the first group of transistors being connected in series to a first input terminal fed with a first in-phase modulated signal identical to said in-phase component signal I of the modulated signal to transmit, each having a drain connected to the input of one of said switches, of said first group, and having different aspect ratios;
   a second group of switches respectively associated to said bit coefficients a$_{1,2}$, each comprising an input and an output, and adapted to be set in an on state or an off state depending on a value of a corresponding switch command signal, the outputs of the switches of said second group being connected to said first output terminal;
   a second group of transistors each having an insulated gate and each insulated gate of the second group of transistors being connected in series to a second input terminal fed with a first quadrature modulated signal equal to said quadrature component signal Q of the modulated signal to transmit multiplied by minus one, each having a drain connected to the input of one of said switches of said second group, and having different aspect ratios;

a third group of switches respectively associated to said bit coefficients $a_{i,2}$, each comprising an input and an output, and adapted to be set in an on state or an off state depending on a value of a corresponding switch command signal, the outputs of the switches of said third group being connected to a second output terminal;

a third group of transistors each having an insulated gate each insulated gate of the third group of transistors being connected in series to said first input terminal fed with said first in-phase modulated signal each having a drain connected to the input of one of said switches of said third group, and having different aspect ratios:

a fourth group of switches respectively associated to said bit coefficients $a_{i,1}$, each comprising an input and an output, and adapted to be set in an on state or an off state depending on a value of a corresponding switch command signal, the outputs of the switches of said fourth group being connected to a second output terminal;

a fourth group of transistors each having an insulated gate and each insulated gate of the fourth group of transistors being connected in series to a third input terminal fed with a second quadrature modulated signal identical to said quadrature component signal Q of the modulated signal to transmit, each having a drain connected to the input of one of said switches of said fourth group, and having different aspect ratios;

a fifth group of switches respectively associated to said bit coefficients $a_{i,1}$, each comprising an input and an output, and adapted to be set in an on state or an off state depending on a value of a corresponding switch command signal, the outputs of the switches of said fifth group being connected to a third output terminal;

a fifth group of transistors, each having an insulated gate and each insulated gate of the fifth group of transistors being connected in series to a fourth input terminal fed with a second in-phase modulated signal equal to said in-phase component signal I of the modulated signal to transmit multiplied by minus one, each having a drain connected to the input of one of said switches of said fifth group, and having different aspect ratios;

a sixth group of switches respectively associated to said bit coefficients $a_{i,2}$ each comprising an input and an output, and adapted to be set in an on state or an off state depending on a value of a corresponding switch command signal the outputs of the switches of said sixth group being connected to said third output terminal;

a sixth group of transistors each having an insulated gate and each insulated gate of the sixth group of transistors being connected in series to said third input terminal fed with said second quadrature modulated signal each having a drain connected to the input of one of said switches of said sixth group, and having different aspect ratios; p1 a seventh group of switches respectively associated to said bit coefficients $a_{i,2}$, each comprising an input and an output, and adapted to be set in an on state or an off state depending on a value of a corresponding switch command signal, the outputs of the switches of said seventh group being connected to a fourth output terminal;

a seventh group of transistors each having an insulated gate each insulated gate of the seventh group of transistors being connected in series to said fourth input terminal fed with said second in-phase modulated signal each having a drain connected to the input of one of said switches of said seventh group, and having different aspect ratios;

a eighth group of switches respectively associated to said hit coefficients $a_{i,1}$, each comprising an input and an output, and adapted to be set in an on state or an off state depending on a value of a corresponding switch command signal, the outputs of the switches of said eighth group being connected to said fourth output terminal; and an eighth group of transistors each having an insulated gate and each insulated gate of the eighth group of transistors being connected in series to said second input terminal fed with said first quadrature modulated signal each having a drain connected to the input of one of said switches of said eighth group, and having different aspect ratios.

4. A signal scaling device according to claim 1, further comprising a control means arranged to convert said bit coefficients $a_{i,j}$ in switch command signals depending on their values, and wherein said scaling means comprises:

first and second groups of branches each mounted in parallel and each branch comprising a switch associated to one of said bit coefficients $a_{i,1}$, adapted to be set in an on state or an off state depending on a value of a corresponding switch command signal and connected in series to a resistor of a chosen resistance;

third and fourth groups of branches each mounted in parallel and each branch comprising a switch associated to one of said bit coefficients $a_{i,2}$, adapted to be set in an on state or an off state depending on a value of a corresponding switch command signal and connected in series to a resistor of a chosen resistance;

a first operational amplifier having an inverting input connected to an input of the branches of said first group and fed with a first in-phase modulated signal identical to said in-phase component signal I of the modulated signal to transmit, through a first resistor of a chosen resistance, a non inverting input connected to the input of the branches of said second group and fed with a second in-phase modulated signal equal to said in-phase component signal I of the modulated signal to transmit multiplied by minus one, through a second resistor of a chosen resistance, a positive output connected to an output of the branches of said first group, and a negative output connected to an output of the branches of said second group;

a second operational amplifier having an inverting input connected to an input of the branches of said third group and fed with a first quadrature modulated signal identical to said quadrature component signal Q of the modulated signal to transmit, through a third resistor of a chosen resistance, a non inverting input connected to an input of the branches of said fourth group and fed with a second quadrature modulated signal equal to said quadrature component signal Q of the modulated signal to transmit multiplied by minus one, through a fourth resistor of a chosen resistance, a positive output connected to the output of the branches of said third group, and a negative output connected to the output of the branches of said fourth group;

a third operational amplifier having an inverting input connected to the positive output of the first operational amplifier through a fifth resistor of a chosen resistance and to the negative output of the second operational amplifier through a sixth resistor of a chosen resistance, a non inverting input connected to the negative output of the first operational amplifier through a seventh resistor of a chosen resistance and to the positive output of the second operational amplifier through an eighth resistor of a chosen resistance, a positive output connected to the inverting input of the third operational amplifier through a ninth resistor of a chosen resistance, and a negative output connected to the non inverting input of the third operational amplifier through a tenth resistor of a chosen resistance;

fifth and sixth groups of branches each mounted in parallel and each branch comprising a switch associated to one of said bit coefficients $a_{i,2}$, adapted to be set in an on state or an off state depending on a value of a corresponding switch command signal and connected in series to a resistor of a chosen resistance;

seventh and eighth groups of branches each mounted in parallel and each branch comprising a switch associated to one of said bit coefficients $a_{i,1}$, adapted to be set in an on state or an off state depending on a value of a corresponding switch command signal and connected in series to a resistor of a chosen resistance;

a fourth operational amplifier having an inverting input connected to an input of the branches of said fifth group and fed with said second in-phase modulated signal through an eleventh resistor of a chosen resistance, a non inverting input connected to the input of the branches of said sixth group and fed with said first in-phase modulated signal through a twelfth resistor of a chosen resistance, a positive output connected to an output of the branches of said fifth group, and a negative output connected to an output of the branches of said sixth group;

a fifth operational amplifier having an inverting input connected to an input of the branches of said seventh group and fed with said first quadrature modulated signal through a thirteenth resistor of a chosen resistance, a non inverting input connected to an input of the branches of said eighth group and fed with said second quadrature modulated signal through a fourteenth resistor of a chosen resistance, a positive output connected to an output of the branches of said seventh group, and a negative output connected to an output of the branches of said eighth group; and a sixth operational amplifier having an inverting input connected to the positive output of the fifth operational amplifier through a fifteenth resistor of a chosen resistance and to a negative output of the sixth operational amplifier through a sixteenth resistor of a chosen resistance, a non inverting input connected to the negative output of the fifth operational amplifier through a seventeenth resistor of a chosen resistance and to a positive output of the sixth operational amplifier through an eighteenth resistor of a chosen resistance, a positive output connected to the inverting input of the sixth operational amplifier through a nineteenth resistor of a chosen resistance, and a negative output connected to the non inverting input of the sixth operational amplifier through a twentieth resistor of a chosen resistance.

5. A signal scaling device according to claim 4, wherein said first to twentieth resistors have a same chosen resistance.

6. A signal scaling device according to claim 1, wherein said phase and/or amplitude modulated signal is a GMSK I/Q signal or a 8PSK I/Q signal.

7. An apparatus comprising:
a baseband device for a transmission path for wireless communication equipment, including a signal scaling device comprising:
a receiver adapted to receive a phase and/or amplitude modulated signal to be transmitted; and
a processing means in operable communication with the receiver and arranged to multiply said phase and/or amplitude modulated signal with a chosen complex gain in order to output said phase and/or amplitude modulated signal with a chosen scaled amplitude and a chosen phase offset, wherein said phase and/or amplitude modulated signal is equal to I+jQ, where I is an in-phase component signal and Q is a quadrature component signal, said complex gain equal to $k_1+jk_2$, where $k_1$ and $k_2$ are chosen gain coefficients, and wherein said chosen scaled amplitude depends on a gain factor equal to $(k_1^2+k_2^2)^{1/2}$, and said phase offset is equal to $\arctan(k_2/k_1)$, and wherein said gain coefficient $k_j$ is equal to $$\sum_{i=-b}^{B-1} a_{i,j} 2^i,$$

where j=1,2 and where $a_{i,j}$ is a bit coefficient equal either to 0 or 1, b is a number of bits representing a fractional part of a chosen binary number η from which a dynamic range value is built, and B is a number of bits representing an integer part of said chosen binary number η, and wherein said processing means comprises:
a selection means arranged to output said bit coefficients $a_{i,j}$ defining said chosen gain coefficients $k_1$ and $k_2$; and
a scaling means fed with said in-phase component signal I and quadrature component signal Q of a phase and/or amplitude modulated signal to transmit, the scaling means arranged to output said phase and/or amplitude modulated signal with a scaled amplitude depending on said outputted bit coefficients $a_{i,j}$.

8. The apparatus of claim 7 wherein the baseband device is a baseband and audio interface device.

9. An apparatus comprising:
a radiofrequency device for a transmission path for wireless communication equipment, including a signal scaling device comprising:
a receiver adapted to receive a phase and/or amplitude modulated signal to be transmitted; and
a processing means in operable communication with the receiver and arranged to multiply said phase and/or amplitude modulated signal with a chosen complex gain in order to output said phase and/or amplitude modulated signal with a chosen scaled amplitude and a chosen phase offset, wherein said phase and/or amplitude modulated signal is equal to I+jQ, where I is an in-phase component signal and Q is a quadrature component signal, said complex gain equal to $k_1+jk_2$, where $k_1$ and $k_2$ are chosen gain coefficients, and wherein said chosen scaled amplitude depends on a gain factor equal to $(k_1^2+k_2^2)^{1/2}$, and said phase offset is equal to $\arctan(k_2/k_1)$, and wherein said gain coefficient $k_j$ is equal to $$\sum_{i=-b}^{B-1} a_{i,j} 2^i,$$

where j=1,2 and where $a_{i,j}$ is a bit coefficient equal either to 0 or 1, b is a number of bits representing a fractional part of a chosen binary number η from which a dynamic range value is built, and B is a number of bits representing an integer part of said chosen binary number η, and wherein said processing means comprises:
a selection means arranged to output said bit coefficients $a_{i,j}$ defining said chosen gain coefficients $k_1$ and $k_2$; and
a scaling means fed with said in-phase component signal I and quadrature component signal Q of a phase and/or amplitude modulated signal to transmit, the scaling means arranged to output said phase and/or amplitude modulated signal with a scaled amplitude depending on said outputted bit coefficients $a_{i,j}$.

10. The device of claim 9, wherein said modulated signal is a GMSK I/Q signal or a 8PSK I/Q signal.

11. A wireless communication device comprising:
a transmission path, wherein said transmission path includes:
   a receiver adapted to receive a phase and/or amplitude modulated signal to be transmitted; and
   a processing means in operable communication with the receiver and arranged to multiply said phase and/or amplitude modulated signal with a chosen complex gain in order to output said phase and/or amplitude modulated signal with a chosen scaled amplitude and a chosen phase offset, wherein said phase and/or amplitude modulated signal is equal to I+jQ, where I is an in-phase component signal and Q is a quadrature component signal, said complex gain equal to $k_1+jk_2$, where $k_1$ and $k_2$ are chosen gain coefficients, and wherein said chosen scaled amplitude depends on a gain factor equal to $(k_1^2+k_2^2)^{1/2}$, and said phase offset is equal to $\arctan(k_2/k_1)$, and wherein said gain coefficient $k_j$ is equal to $$\sum_{i=-b}^{B-1} a_{i,j} 2^i,$$

where j=1,2 and where $a_{i,j}$ is a bit coefficient equal either to 0 or 1, b is a number of bits representing a fractional part of a chosen binary number η from which a dynamic range value is built, and B is a number of bits representing an integer part of said chosen binary number η, and wherein said processing means comprises:
   a selection means arranged to output said bit coefficients $a_{i,j}$ defining said chosen gain coefficients $k_1$ and $k_2$; and
   a scaling means fed with said in-phase component signal I and quadrature component signal Q of a phase and/or amplitude modulated signal to transmit, the scaling means arranged to output said phase and/or amplitude modulated signal with a scaled amplitude depending on said outputted bit coefficients $a_{i,j}$.

12. The device of claim 11, comprising a baseband device that includes the receiver and processing means.

13. The device of claim 11, comprising a radiofrequency device that includes the receiver and processing means.

14. A device comprising:
a receiver configured to receive a modulated signal to be transmitted; and
a processor operably coupled to the receiver and configured to:
   multiply the modulated signal with a complex gain;
   output the modulated signal with a scaled amplitude and a phase offset, and wherein the complex gain has a gain coefficient $k_j$ that is is equal to $$\sum_{i=-b}^{B-1} a_{i,j} 2^i,$$

where j=1,2 and where $a_{i,j}$ is a bit coefficient equal either to 0 or 1, b is a number of bits representing a fractional part of a chosen binary number η from which a dynamic range value is built, and B is a number of bits representing an integer part of the binary number η;
   output said bit coefficients $a_{i,j}$ defining gain coefficients $k_1$ and $k_2$; and
   output said modulated signal with a scaled amplitude depending on the outputted bit coefficients $a_{i,j}$.

15. The device of claim 14, wherein the modulated signal is equal to I+jQ, where I is an in-phase component signal and Q is a quadrature component signal, the complex gain equal to $k_1+jk_2$, and wherein the scaled amplitude depends on a gain factor equal to $(k_1^2+k_2^2)^{1/2}$, and the phase offset is equal to $\arctan(k_2/k_1)$.

16. The device of claim 14, wherein said modulated signal is a GMSK I/Q signal or a 8PSK I/Q signal.

17. A method comprising:
receiving a modulated signal to be transmitted;
multiplying the modulated signal with a complex gain;
outputting the modulated signal with a scaled amplitude and a phase offset, and wherein the complex gain has a gain coefficient $k_j$ that is is equal to $$\sum_{i=-b}^{B-1} a_{i,j} 2^i,$$

where j=1,2 and where $a_{i,j}$ is a bit coefficient equal either to 0 or 1, b is a number of bits representing a fractional part of a chosen binary number η from which a dynamic range value is built, and B is a number of bits representing an integer part of the binary number η;
   outputting said bit coefficients $a_{i,j}$ defining gain coefficients $k_1$ and $k_2$; and
   outputting said modulated signal with a scaled amplitude depending on the outputted bit coefficients $a_{i,j}$.

18. The method of claim 17, wherein the modulated signal is equal to I+jQ, where I is an in-phase component signal and Q is a quadrature component signal, the complex gain equal to $k_1+jk_2$, and wherein the scaled amplitude depends on a gain factor equal to $(k_1^2+k_2^2)^{1/2}$, and the phase offset is equal to $\arctan(k_2/k_1)$.

19. The method of claim 17, wherein said modulated signal is a GMSK I/Q signal or a 8PSK I/Q signal.

* * * * *

UNITED STATES PATENT AND TRADEMARK OFFICE
CERTIFICATE OF CORRECTION

PATENT NO. : 7,991,076 B2  Page 1 of 1
APPLICATION NO. : 11/572910
DATED : August 2, 2011
INVENTOR(S) : Peter Bode et al.

It is certified that error appears in the above-identified patent and that said Letters Patent is hereby corrected as shown below:

Item 75
"Peter Bode, Nuremberg (DE); Alexander Lampe, Leipzig (DE); Markus Helfenstein, Lucerne (CH)" should read as --Peter Bode, Nurenberg (DE); Alexander Lampe, Leipzig (DE); Markus Helfenstein, Lucerne (CH)--.

Column 13
Claim 3, Line 52, "of said sixth group, and having different aspect ratios; p1" should read as --of said sixth group, and having different aspect ratios;--.

Column 18
Claim 18, Line 54, "arctan($k_2k_1$." should read as --arctan($k_2k_1$).--.

Signed and Sealed this
Fourth Day of October, 2011

David J. Kappos
*Director of the United States Patent and Trademark Office*